United States Patent [19]
Branch et al.

[11] Patent Number: 5,760,742
[45] Date of Patent: Jun. 2, 1998

[54] INTEGRATED MOBILE GIS/GPS/AVL WITH WIRELESS MESSAGING CAPABILITY

[75] Inventors: Charles N. Branch; Mark E. Nichols, both of Sunnyvale; James M. Janky, Los Altos, all of Calif.

[73] Assignee: Trimble Navigation Limited, Sunnyvale, Calif.

[21] Appl. No.: 915,192

[22] Filed: Aug. 20, 1997

Related U.S. Application Data

[63] Continuation of Ser. No. 439,967, May 12, 1995, abandoned.

[51] Int. Cl.[6] .................... G01S 3/02; H04B 7/29; G01C 21/00
[52] U.S. Cl. .................... 342/457; 455/456; 701/207
[58] Field of Search ................... 342/357, 457; 455/426, 456, 457, 575, 99; 701/207, 213

[56] References Cited

U.S. PATENT DOCUMENTS

| | | | |
|---|---|---|---|
| 4,286,335 | 8/1981 | Eichler et al. | 455/89 |
| 4,627,107 | 12/1986 | Hohlfeld et al. | 455/89 |
| 5,025,261 | 6/1991 | Ohta et al. | 342/357 |
| 5,214,757 | 5/1993 | Mauney et al. | 395/161 |
| 5,261,121 | 11/1993 | Hashimoto | 455/89 |
| 5,317,321 | 5/1994 | Sass | 342/357 |
| 5,364,093 | 11/1994 | Huston et al. | 364/449 |
| 5,381,338 | 1/1995 | Wsyocki et al. | 364/449 |
| 5,414,432 | 5/1995 | Penny, Jr. et al. | 342/357 |
| 5,457,814 | 10/1995 | Myrskog et al. | 455/89 |
| 5,559,520 | 9/1996 | Barzegar et al. | 342/357 |
| 5,574,987 | 11/1996 | Wallace | 455/89 |

*Primary Examiner*—Gregory C. Issing
*Attorney, Agent, or Firm*—Patrick T. King

[57] ABSTRACT

An integrated geographic information and automatic position locating system. In one embodiment, a communication link is provided between a vehicle and at least one base station. A vehicle position tracking system, coupled to a vehicle to be monitored, is connected to the communication link. Likewise, a geographic mapping system also disposed within the vehicle is connected to the communication link. In the present embodiment, the vehicle position tracking system and the geographic mapping system are housed in a portable data terminal. The portable data terminal is removably placed into a docking station located within the vehicle. The integrated vehicle position tracking system and geographic mapping system function both when placed in the docking station, and when removed from the docking station. Thus, the present invention provides a mobile integrated vehicle position tracking system and the geographic mapping system integrated into a portable data terminal. Furthermore, in the present embodiment, the communication link provided between the vehicle and at least one base station can be accessed and utilized even when the portable data terminal is not located within the docking station.

8 Claims, 11 Drawing Sheets

INTEGRATED MOBILE GIS/GPS/AVL WITH WIRELESS MESSAGING CAPABILITY

This application is a file wrapper continuation of application Ser. No. 08/439,967, now abandoned.

TECHNICAL FIELD

The present invention relates generally to geographic information systems and, more particularly, to geographic information systems integrated with automatic vehicle location systems.

BACKGROUND ART

Geographic information systems (GISs) have been used for years in many industries. GIS technology has found widespread use in, for example, electric and gas utility companies and telecommunication/cable T.V. applications. However, conventional GISs often provide limited services to the user. That is, conventional GISs typically allow the user to display existing background maps on a computer, access previously entered attribute data, and capture additional data. The limited uses combined with the high expense of conventional GISs render such systems unattractive to many potential consumers. Additionally, in conventional GISs, it is extremely expensive to initially populate the GIS data base. Due to poor communication between the "field" and the GIS data base center, getting data from the field to the GIS data base center is an expensive procedure.

Attempts have been made to enhance the marketability and functionality of conventional GISs. For example, Mauney et al. in U.S. Pat. No. 5,214,757 disclose an automated, fully transportable mapping system which utilizes position information gathered from a Global Positioning System (GPS). The position information is used to create new maps or annotate existing maps contained in a GIS data base. Mauney et al. further disclose capturing geographic attribute data in real-time and displaying position information captured by the GPS in real-time. Specifically, the Mauney et al. device displays position information in real-time such that users can track the path on which they are traveling. Geographic attribute data captured while traveling along a path is immediately entered into the automated, fully transportable mapping system. Hence, the data is captured in "real-time." The newly entered attribute data is stored in a file for subsequent inclusion in a GIS data base. Thus, in the Mauney et al. system, even if attribute data is gathered in real-time, the data is then post processed into the GIS data base at a later date.

Mauney et al. also disclose attaching a receiver of the GPS to a portable GIS unit which can be carried by a user. Thus, the GPS receiver can be carried along the path to be mapped, with the remainder of the system remaining at the lab or office. The GPS information is then relayed from the receiver on the portable unit to a GPS computer by way of radio or mobile telephone communication. Therefore, the Mauney et al. system provides GPS capability for precisely creating new maps or annotating existing maps contained in a GIS data base.

Although the Mauney et al. device slightly broadens the functionality of conventional GISs by allowing GPS technology to create and annotate existing GIS data bases, the limited uses and high costs of such a system are still unattractive to many potential consumers.

Consequently, the need has arisen for a versatile GIS which has expanded functionality, a versatile GIS which is not limited to merely using GPS technology to create and annotate existing GIS data bases, and a versatile GIS system which has improved marketability to potential consumers.

DISCLOSURE OF THE INVENTION

It is, therefore, an object of the present invention to provide a versatile GIS which has expanded functionality, a versatile GIS which is not limited to merely using GPS technology to create and annotate existing GIS data bases, and a versatile GIS system which has improved marketability to potential consumers. The above object has been achieved by an integrated geographic information and automatic position location system.

In one embodiment of the present invention, a communication node including a transmitter and a receiver is disposed within a vehicle whose position is to be monitored. The communication node provides for the exchange of information between the integrated geographic information and automatic vehicle location system and at least one desired location such as a base station. The integrated geographic information and automatic vehicle location system includes a vehicle position tracking system which is coupled to the communication node. The present invention also includes a geographic mapping system which is also coupled to the communication node. Although the integrated geographic information and automatic position locating system is described in most of the following embodiments as being disposed within a vehicle, the present invention is also well suited, for example, to being carried by hand, disposed in other conveyances, and the like. Furthermore, although the present embodiment specifically recites an integrated "geographic" information and automatic position location system, the present invention is also well suited to using "non-geographic" information. In such an instance, non-geographic information such as utility company power pole inventory data, transformer specifications, and the like, are used in conjunction with the automatic position location system.

In the present embodiment, the vehicle position tracking system includes a GPS signal receiver, and a signal processor coupled to the signal receiver for generating position information from GPS signals received by the GPS signal receiver. The geographic mapping system includes memory for storing previously recorded geographic information, an input for entering new geographic information, and a display for displaying visual images of the previously recorded geographic information and the newly entered geographic information. In the present embodiment, the previously recorded geographic information can be updated when desired using position information generated by the GPS employed in the vehicle position tracking system.

Furthermore, in the present embodiment, the communication node coupled to both the vehicle position tracking system and the geographic mapping system provides a two-way communication link between the integrated geographic information and automatic vehicle location system and at least one desired location such as a base station. In so doing, a user of the geographic mapping system can immediately receive information. Thus, in one embodiment, the present invention eliminates the need for a user to return to a base station to download newly captured attribute data into the GIS data base. Likewise, the previously recorded geographic information in the possession of the user can be immediately updated with new geographic information. Additionally, the base station can communicate with the user via the present integrated geographic information and automatic vehicle location system even when the user is not at the base station.

The present invention is also well suited to providing communication to more than one base station. That is, the present invention is well suited to providing communication to an automatic vehicle location base station and to a separately located geographic information base station. Also, the present invention is also well suited to providing communication to only one of either the automatic vehicle location base station or the geographic information base station.

In the present embodiment, the input and display unit of the geographic mapping system are also used by the vehicle position tracking system. Thus, a vehicle monitor at the base station can immediately inform a user, for example, that the user has varied from a specified work route. Likewise, the user can send messages to the vehicle monitor back at the base station. The vehicle user might inform the base station, for example, that a deviation from the scheduled route is required due to a detour, a traffic accident, and the like.

In the present embodiment, the communication link established between the integrated geographic information and automatic vehicle location system and the desired location is established using one of various communication link techniques. Furthermore, in one embodiment of the present invention the communication link is a real-time two-way communication link.

In another embodiment of the present invention, an in-vehicle navigation system is integrated with the geographic information and automatic vehicle location system and is coupled to the communication node, thereby providing yet another degree of functionality.

In yet another embodiment of the present invention, a portable data terminal is removably disposed within a docking station located within the vehicle to be monitored. In the present embodiment, the portable data terminal is also coupled to the communication node. The portable data terminal further includes an input for entering information, and a display unit. Thus, in the present embodiment, a user can remove the portable data terminal from the docking station within the vehicle and carry the portable data terminal wherever desired. Attribute data is then captured using the input for entering information. Also, geographic information or position location information can be displayed on the display unit of the portable data terminal. More specifically, the present invention provides the ability to display a map on which is superimposed the user's present position. The portable data terminal is also able to communicate with at least one desired location such as, for example, a base station even when the portable data terminal is removed from the vehicle. In one embodiment of the present invention, the GPS receiver is located within the portable data terminal. As a result, the position of the user of the present invention is known even when the user is not located at the vehicle.

In still another embodiment, the integrated geographic information and automatic vehicle location system further includes a panic button for alerting at least one desired party, via the communication node, that a user of the integrated geographic information and automatic position locating system is in distress.

Thus, the present invention provides a versatile GIS which has expanded functionality, a versatile GIS which is not limited to merely using GPS technology to create and annotate existing GIS data bases, and a versatile GIS system which has improved marketability to potential consumers.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1A:
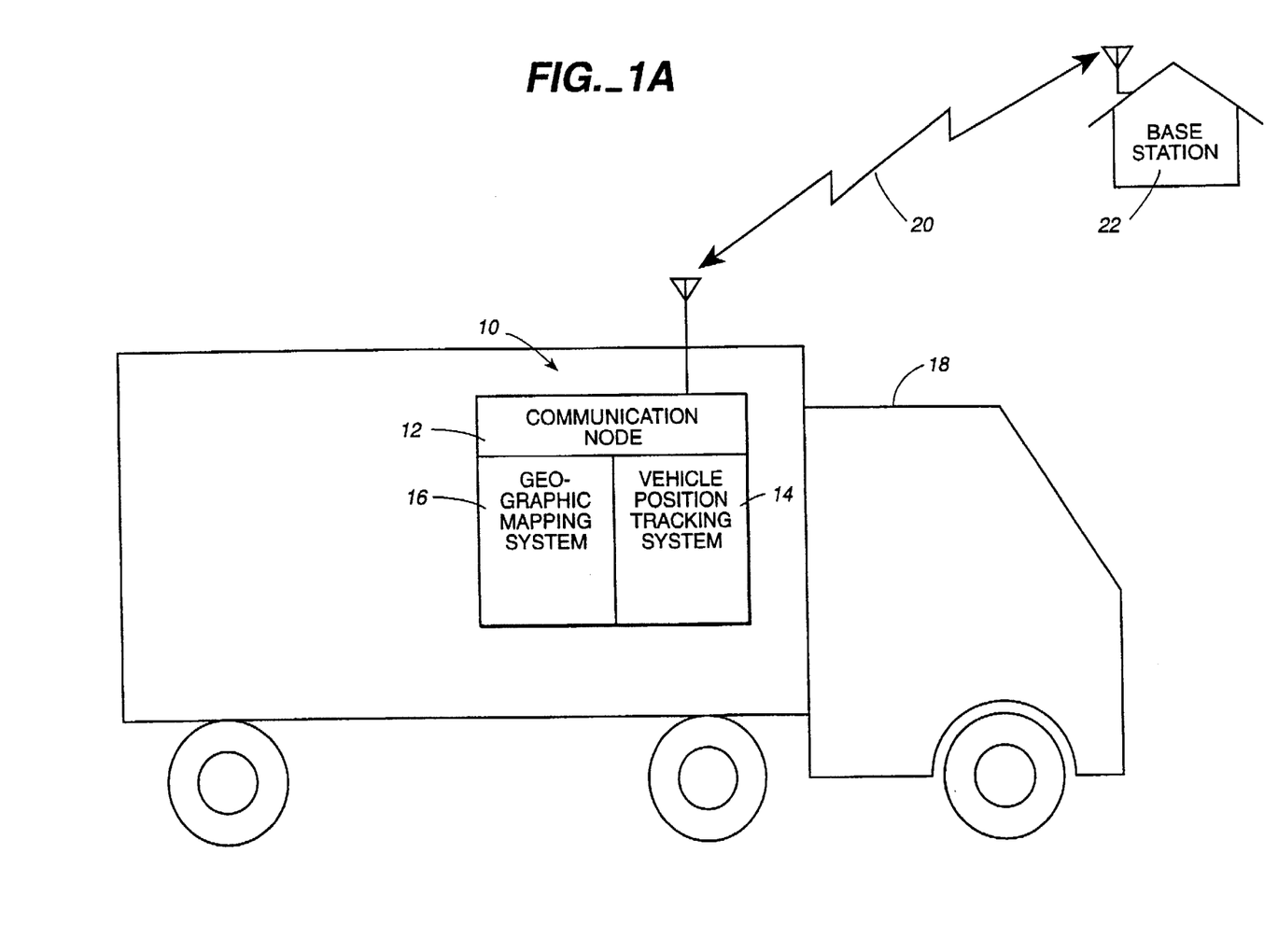
FIG. 1A is a schematic diagram of an integrated geographic information and automatic vehicle location system in accordance with the present invention.

With reference now to FIG. 1A, a schematic block diagram illustrating various components of the present invention is shown. As shown in FIG. 1A, the present integrated geographic information and automatic vehicle location system 10 including a communication node 12, a vehicle position tracking system 14, and a geographic mapping system 16 is disposed within a vehicle 18. In the present embodiment, vehicle 18 is, for example, a utility company vehicle. It will be understood, by those of ordinary skill in the art, that vehicle 18 could be any one of numerous other types of vehicles as well. Vehicle position tracking system 14, and geographic mapping system 16 are both coupled to communication node 12. Communication node 12 provides a communication link 20 between a base station 22 and integrated geographic information and automatic vehicle location system 10.

Figure 1B:
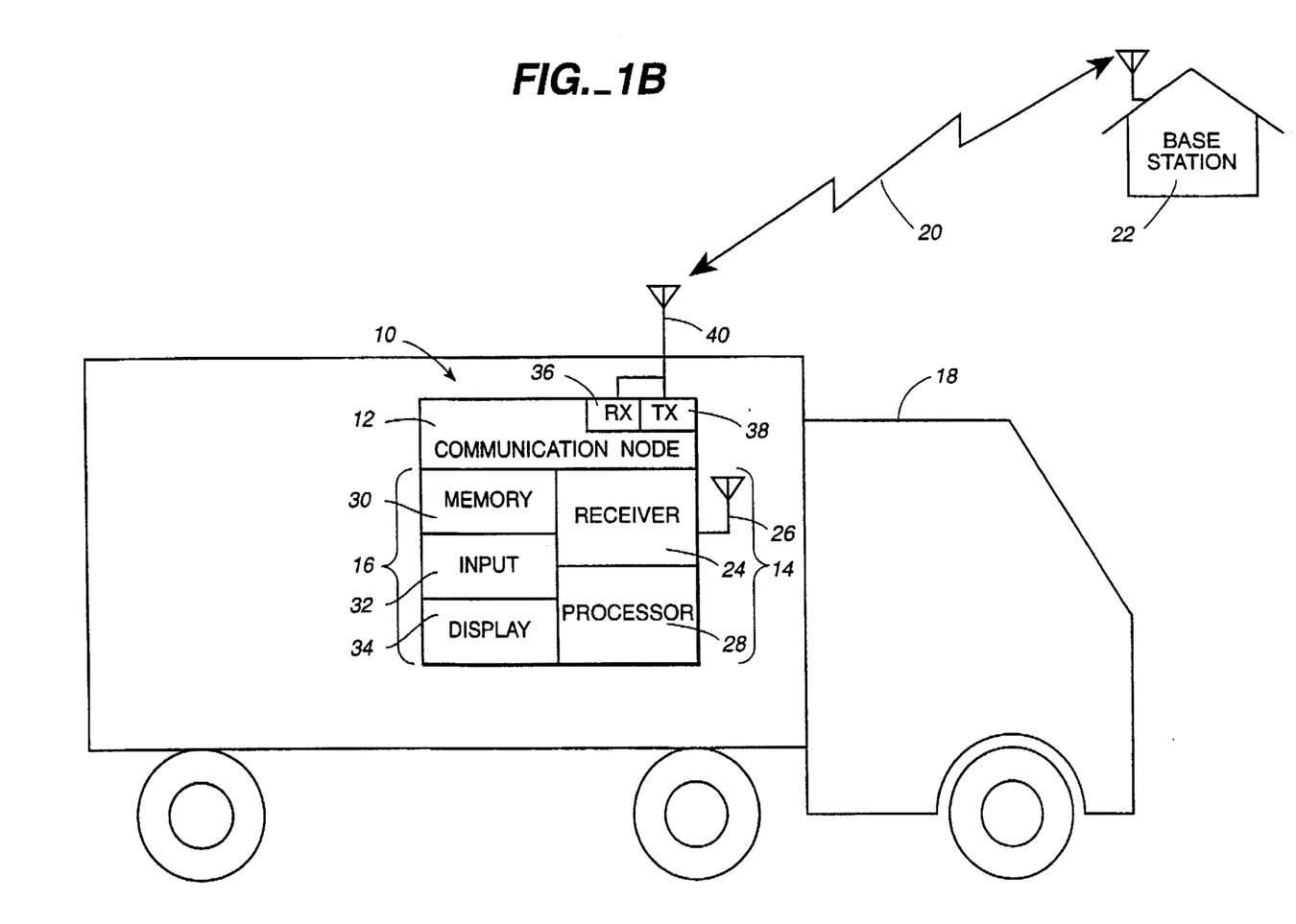
FIG. 1B is a more detailed schematic diagram of the integrated geographic information and automatic vehicle location system of FIG. 1A in accordance with the present invention.

With reference next to FIG. 1B, a more detailed schematic block diagram of integrated geographic information and automatic vehicle location system 10 illustrating various components of the present invention is shown. In the present embodiment, vehicle position tracking system 14 includes a receiver 24 having an antenna 26 attached thereto, and a signal processor 28. In the present invention, vehicle position tracking system 14 is, for example, GPS-based position tracking system. GPS signal received at antenna 26 of receiver 24 are processed by processor 28 to give the precise geographic location of vehicle 18. The present invention is also well suited, however, to transmitting the received signals back to base station 22 for processing. The position of the vehicle is then monitored, for example, by a dispatcher located at base station 22. The dispatcher monitors vehicle 18 to insure that vehicle 18 remains on a given route, or the dispatcher positions the utility vehicles for the most efficient coverage, or the dispatcher determines which utility vehicle is nearest to an emergency and the like. Thus, the present invention enables the position of vehicle 18 to be precisely monitored.

Although GPS is specifically recited in the present embodiment, other satellite-based systems such as the Global Orbiting Navigational Satellite System (GLONASS) are also well suited to the present invention. Also, although a satellite-based position determining system is specifically mentioned in the present embodiment, the present invention is also well suited to land-based radio navigation systems such as, for example, LORAN, Shoran, Decca, and TACAN.

With reference still to FIG. 1B, geographic mapping system 16 further includes memory 30, an input 32 for entering information, and a display unit 34. In the present embodiment, memory 30 stores, for example, previously recorded geographic information. Input 32 in the present embodiment is comprised, for example, of a data entry keypad, a pen-type data entry pad, and the like. In conventional geographic mapping systems, while physically present at the base station, the user of the prior art GIS device would download, for example, geographic attributes of a desired area. If the user of the prior art device wished to obtain geographic information on a different area, the user would return to the base station and download the additional information. In the present invention, however, geographic information on a desired area can either be downloaded while the user is located at the base station or, geographic information can be transmitted to the user over communication link 20. Thus, the present invention eliminates the need for the user to be at the base station in order to receive information. Consequently, the user can also receive new geographic information, via receiver 36 and antenna 40 of communication node 12, on a different area without having to return to the base station. Furthermore, although the present embodiment specifically recites an integrated "geographic" information and automatic position location system, the present invention is also well suited to using "non-geographic" information. In such an instance, non-geographic information such as utility company power pole inventory data, transformer specifications, and the like, are used in conjunction with the automatic position location system. Thus, in such an embodiment, the present invention provides an integrated "information reporting" and automatic position location system.

Although geographic information is immediately transmitted over communication link 20 in the present embodiment, the present invention is also well suited to storing geographic information in memory 30 and transmitting it to base station 22 at a later time. Likewise, the present invention is well suited to storing geographic information in memory 30 and downloading the information to the geographic information data base when the user returns to base station 22. The present invention is well suited to being employed as a core module in an on-vehicle computer. However, the present invention is also well suited to being employed as, for example, a Personal Computer Memory Card International Association card (PCMCIA) card". That is, the present integrated geographic information and automatic vehicle location system 10 can be configured as a mobile lightweight and easy to use card system in a format similar to, for example, the ASPEN card system, or the Trimble Mobile Gold Card System of Trimble Navigation Ltd., Sunnyvale Calif.

In the present embodiment, the geographic information contained within memory 30 is displayed on display unit 34. In addition to displaying geographic mapping system information on display unit 34, the present invention also displays vehicle position tracking information on display unit 34. Such vehicle position tracking information includes, for example, the location of other utility service vehicles.

In addition to receiving geographic information over communication link 20, the present invention also transmits information, via transmitter 38 and antenna 40 of communication node 12, over communication link 20. In so doing, the present invention is able to update previously recorded geographic information. For example, a user of the present invention might discover that the position of a geographic attribute has been erroneously surveyed. The user of the present invention then transmits the corrected position of the geographic attribute back to the base station to update the existing data base. In the present invention, the precise position locating capabilities of the GPS in vehicle position tracking system 14 provide additional updating capability. That is, a user of the present invention is able to precisely determine the position of geographic attributes using GPS technology. If the user determines that previously recorded geographic information is inaccurate, the user transmits the correct coordinates to base station 22. The present invention is also well suited to placing the updated/corrected geographic information into a storage file. A data base manager is then able to review updated/corrected geographic information submitted from the field. The data base manger is then able to approve or deny inclusion of the updated/corrected geographic information into the data base. As a result, the present invention allows for updating of a geographic information data base while still allowing a data base manager to monitor the integrity of the data base.

In the present embodiment, communication link 20 between integrated geographic information and automatic vehicle location system 10 and base station 22 is a two-way communication link. Although such a communication link is used in the present embodiment, the present invention is also well suited to employing a one-way link between integrated geographic information and automatic vehicle location system 10 and base station 22. Furthermore, the present invention is also well suited to having a real-time communication link between integrated geographic information and automatic vehicle location system 10 and base station 22.

In addition to transmitting geographic mapping system information over link 20, via transmitter 38 and antenna 40 of communication node 12, the present invention also transmits vehicle position tracking information, entered using input 32, over link 20. Such vehicle position tracking information might includes, for example, that a deviation from the scheduled route is required due to a detour, a traffic accident, and the like. Thus, the present embodiment provides an integrated geographic information and automatic vehicle location system 10 wherein a geographic mapping system 16 and a vehicle position tracking system 14 share a communication node 12, an input 32, and a display 34.

In the present invention, communication link 20 is established in one of many ways. For example, communication link 20 can be established using a Metricomm Wide Area Network (WAN) link operating at approximately 900 MHz. Communication link 20 can be established using a standard cellular telephone connection. Communication link 20 can also be established using a trunked radio system. In such a system, transmitter 38 of communication node 12 first contacts "headquarters" or a communication base and is assigned a communication channel. Communication node 12 then knows that communication between integrated geographic information and automatic vehicle location system 10 and base station 22 must take place over the assigned channel. Communication link 20 can also be established using a Cellular Digital Packet Data (CDPD) protocol. In the CDPD protocol, a modem and a radio are used to send data at a rate of 19.2 Kbits/s over cellular circuits not currently being used for voice transmissions. A control channel is called, and the user is assigned a channel. Communication node 12 then bursts packet data, using, for example, ECP/IP protocol, to deliver the data to base station 22 until the data is completely transmitted or until the channel is no longer free. If the data is not completely transferred when the channel expires, communication link 20 is then established using a different channel. As yet another example, communication link 20 can be established using a Subscription Mobile Radio (SMR) system wherein integrated geographic information and automatic vehicle location system 10 has an assigned frequency for communication link 20. The present invention is also well suited to having an rf communication link 20 between integrated geographic information and automatic vehicle location system 10 and base station 22. Additionally, although all of the components of the present invention communicate with the same base station in the present embodiment, the present invention is also well suited to having the components communicate with different respective base stations.

Figure 1C:
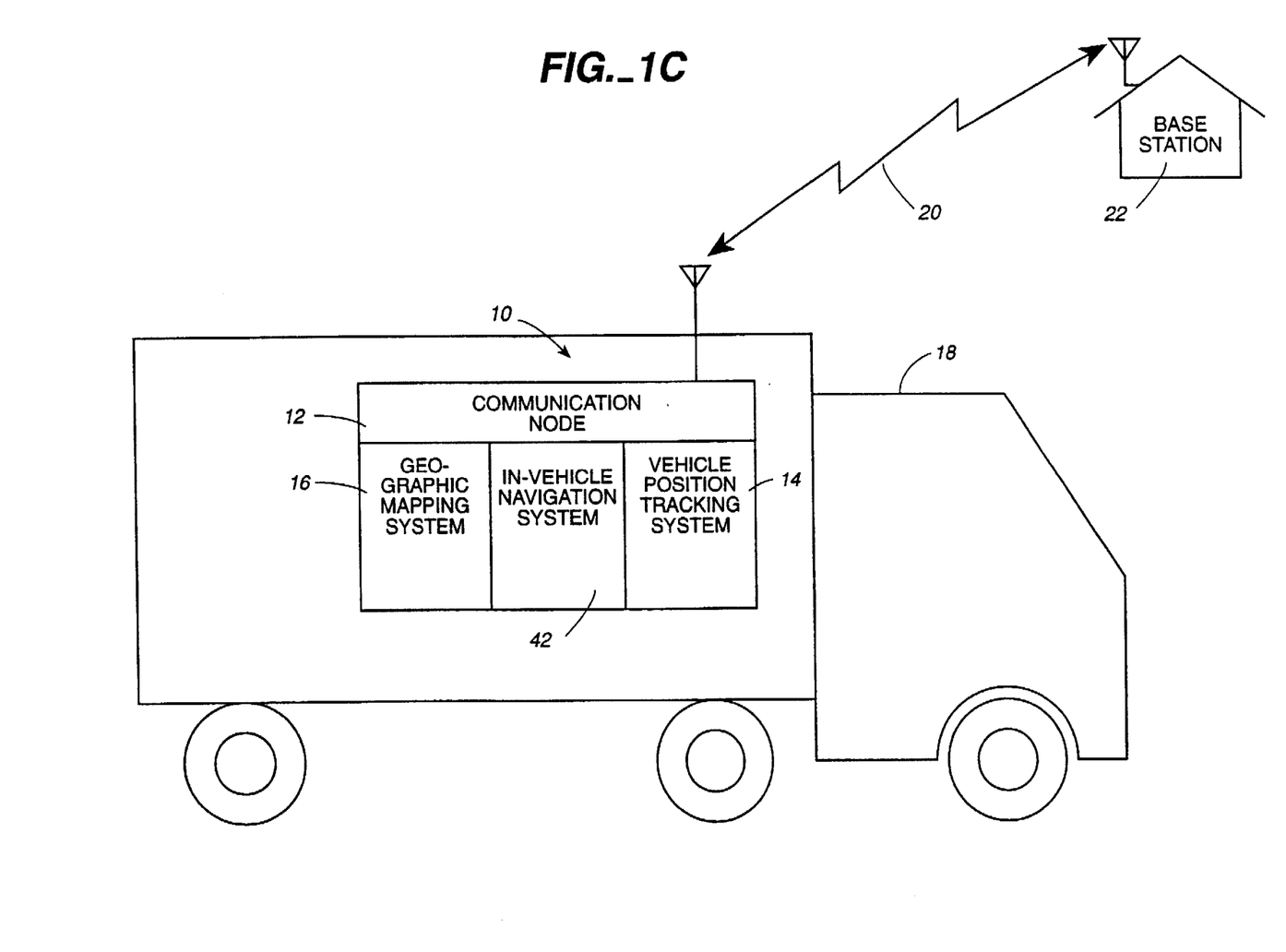
FIG. 1C is a schematic diagram of the integrated geographic information and automatic vehicle location system of FIG. 1A including an in-vehicle navigation system in accordance with the present invention.

With reference next to FIG. 1C, a schematic diagram of another embodiment of the present invention in which the integrated geographic information and automatic vehicle location system includes an in-vehicle navigation system 42 is shown. In-vehicle navigation system typically includes a data base located at a base station for storing navigational information. As shown in FIG. 1C, in-vehicle navigation system 42 is coupled to communication node 12. Therefore, in the present embodiment, navigational information can be transmitted to vehicle 18 when desired. As a result, new navigational information is accessible to a user of the present system without requiring the user to return to the base station. In the present embodiment, the navigational information is displayed on display unit 34 of FIG. 1B. Thus, a user of the present invention can access navigational information and have the information visually displayed within vehicle 18. Likewise, input 32 of FIG. 1B is also used to input various in-vehicle navigation-related information. Such information includes, for example, a request for the base station to transmit navigation information on a desired area. Thus, the present invention provides yet another degree of functionality and marketability. Although the present embodiment specifically recites the use of an in-vehicle navigation system, the present invention is also well suited to the use of a navigation system which is not specifically a "in-vehicle" navigation system. That is, the present invention is also well suited to providing a navigation system to a unit which is hand-carried or otherwise conveyed.

Figure 1D:
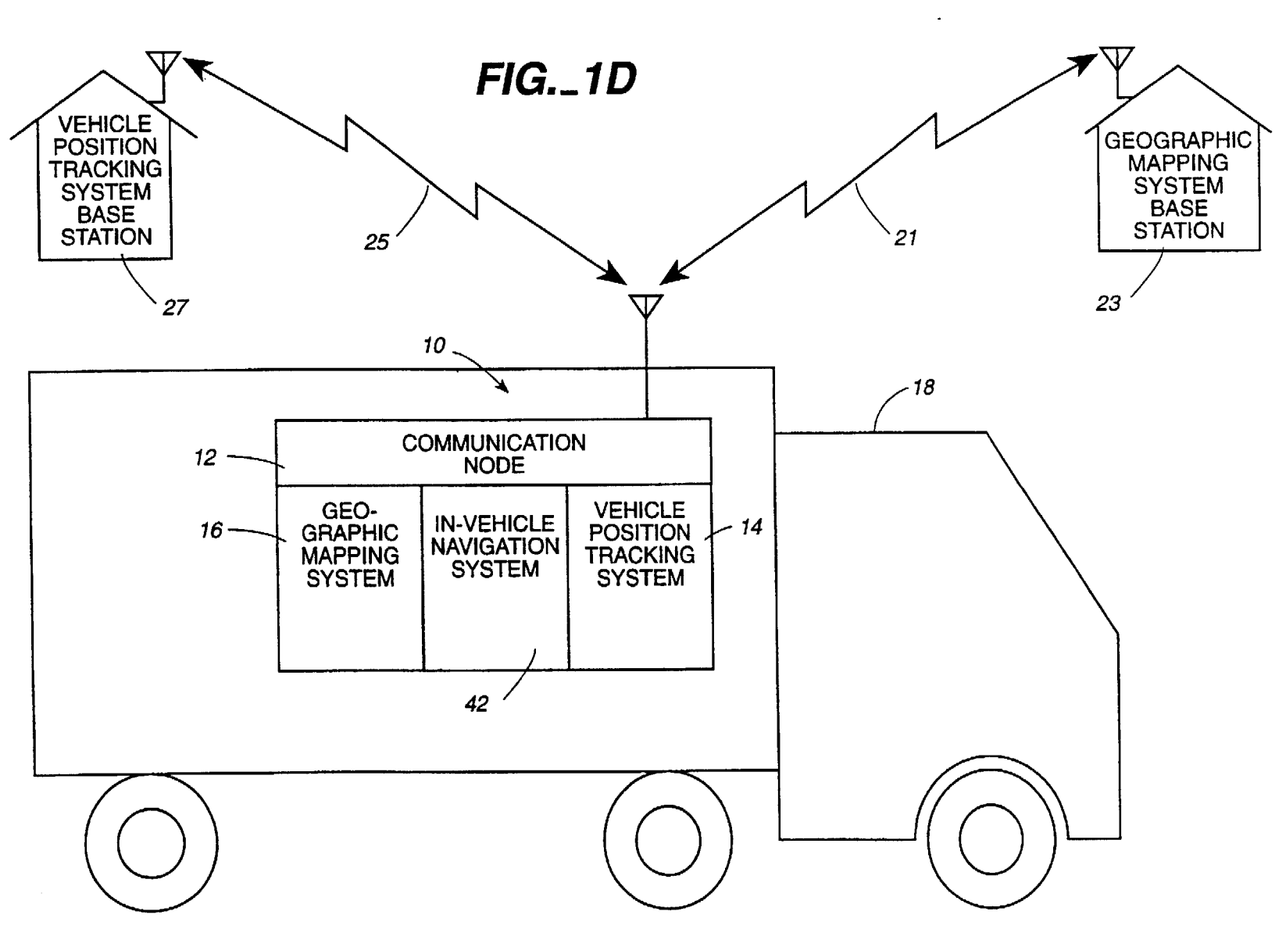
FIG. 1D is a schematic diagram of a hand-carried integrated geographic information and automatic position location system in accordance with the present invention.

With reference next to FIG. 1D, a schematic diagram of another embodiment of the present invention is shown in which the integrated geographic information and automatic vehicle location system communicates with two separately located base stations. As shown in FIG. 1D, the present invention is also well suited to providing communication to more than one base station. That is, the present invention is well suited to providing communication between a separately geographic mapping base station 23 via communication link 21, and to providing communication between a vehicle position tracking base station 27 via communication link 25. In the present embodiment, communication link 21 is a CDPD link, while communication link 25 is a radio link. Although such types of communication links are specified in the present embodiment, the present invention is also well suited to numerous other types of communication links. In one embodiment of the present invention, each of base stations 23 and 27 would have a unique "phone" number or activation protocol. During use, a field worker would simply dial the phone number or activate the communication link using the activation protocol to communicate with the desired base station. Also, the present invention is also well suited to providing communication to only one of either geographic mapping system base station 23 or vehicle position tracking system base station 27.

Figure 1E:
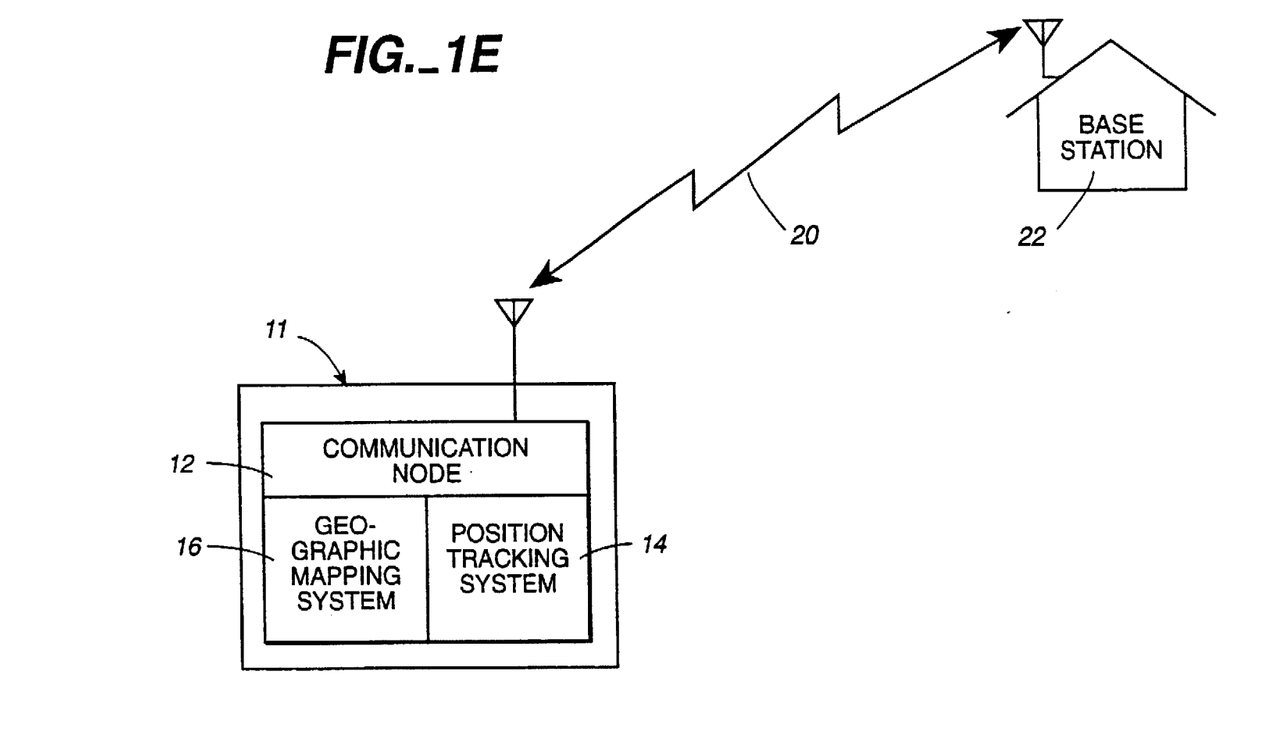
FIGURE 1E is a "hand-carried" integrated geographic information and automatic position locating system in accordance with the present invention.

With reference next to FIG. 1E, a schematic diagram of another embodiment of the present invention is shown in which an integrated geographic information and automatic position locating system 11 is not disposed within a vehicle. As shown in FIG. 1E, the present invention is also well suited to being hand-carried or otherwise conveyed, without being disposed in a vehicle as shown in the embodiments of FIGS. 1A–1D. That is, the present invention is well suited, for example, to being carried by hand, disposed in other conveyances, and the like. As in the previous embodiments, communication node 12 provides a communication link 20 between a base station 22 and integrated geographic information and automatic position locating system 11.

Figure 2A:
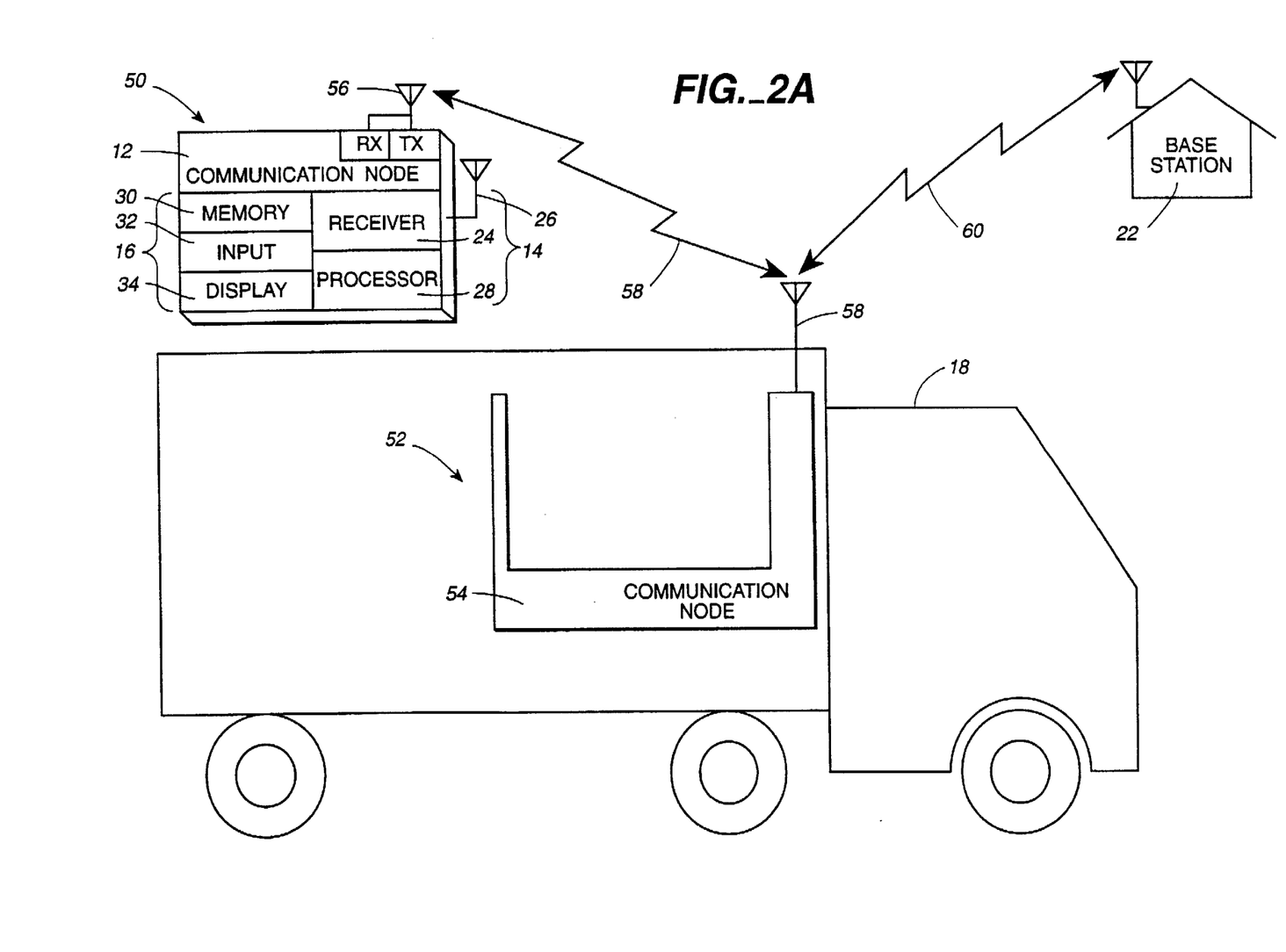
FIG. 2A is a schematic diagram of an integrated geographic information and automatic vehicle location system wherein the integrated geographic information and automatic vehicle location system includes a portable data terminal in accordance with the present invention.

With reference next to FIG. 2A, a schematic diagram of another embodiment of the present invention is shown wherein the system 10 includes a portable data terminal 50. In the present embodiment, communication node 12, a vehicle position tracking system 14, and a geographic mapping system 16 are disposed within a portable data terminal 50. A docking station 52 is disposed within vehicle 18. As shown in FIG. 2A, portable data terminal 50 is removably attachable to docking station 52. That is, portable data terminal 50 can perform all of the functions of the above-described embodiments when disposed within docking station 52 and when removed from docking station 52.

In the present embodiment, portable data terminal 50 is a compact transportable unit which allows the user to carry portable data unit 50 to locations distant from vehicle 18. Thus, a user can enter geographic information or communicate with the base station even when away from vehicle 18. Additionally, in the present embodiment, portable data terminal has the GPS receiver contained therein. Thus, in the present embodiment, the position of the user is known by the dispatcher even when the user is not located within the vehicle. Such information can be extremely beneficial should the user become injured or need to be located. That is, instead of having to return to vehicle 18 to activate a panic button, the user can activate a panic button, not shown, located on portable data terminal 50. The distress signal then includes the geographic coordinates of the distressed user, not the coordinates of vehicle 18, thereby providing more efficient and faster responses.

In the present invention, communication link 20 is established in one of numerous method described in conjunction with the above-mentioned embodiments. That is, communication link 20 can be established using, for example, a Metricomm Wide Area Network (WAN) link, a standard cellular telephone connection, a trunked radio system, a Cellular Digital Packet Data (CDPD) protocol, a Subscription Mobile Radio (SMR) system, or an rf communication link and the like.

With reference still to FIG. 2A, in the present embodiment, when portable data terminal 50 is removed from docking station 52, portable data terminal 50 communicates with docking station 52. More specifically, communication node 12 of portable data terminal 50 transfers information over link 58 to communication node 54 of docking station 52. Docking station 52 then transfers information to and from base station 22 over link 60. In so doing, portable data terminal 50 is able to transmit using low power and still communicate, through docking station 52, with base station 22. Thus, portable data terminal 50 is able to operate using low power sources such as batteries. As with communication link 20 of FIGS. 1A–1C, communication links 58 and 60 can be established using, for example, any combination of Metricomm Wide Area Network (WAN) links, a standard cellular telephone connections, a trunked radio system, a Cellular Digital Packet Data (CDPD) protocol, a Subscription Mobile Radio (SMR) system, or rf communication links and the like. Although communication node 54 of docking station 52 acts as a relay station for information transmitted to portable data terminal 50 from base station 22, the present invention is also well suited to having base station 22 transmit information directly to communication node 12 of portable data terminal 50.

In the present embodiment, communication links 58 and 60 are two-way communication links. Although such communication links are used in the present embodiment, the present invention is also well suited to employing one-way links between portable data terminal 50 and docking station 52, and docking station 52 and base station 22. Furthermore, the present invention is also well suited to having real-time communication links between portable data terminal 50 and docking station 52, and docking station 52 and base station 22.

Figure 2B:
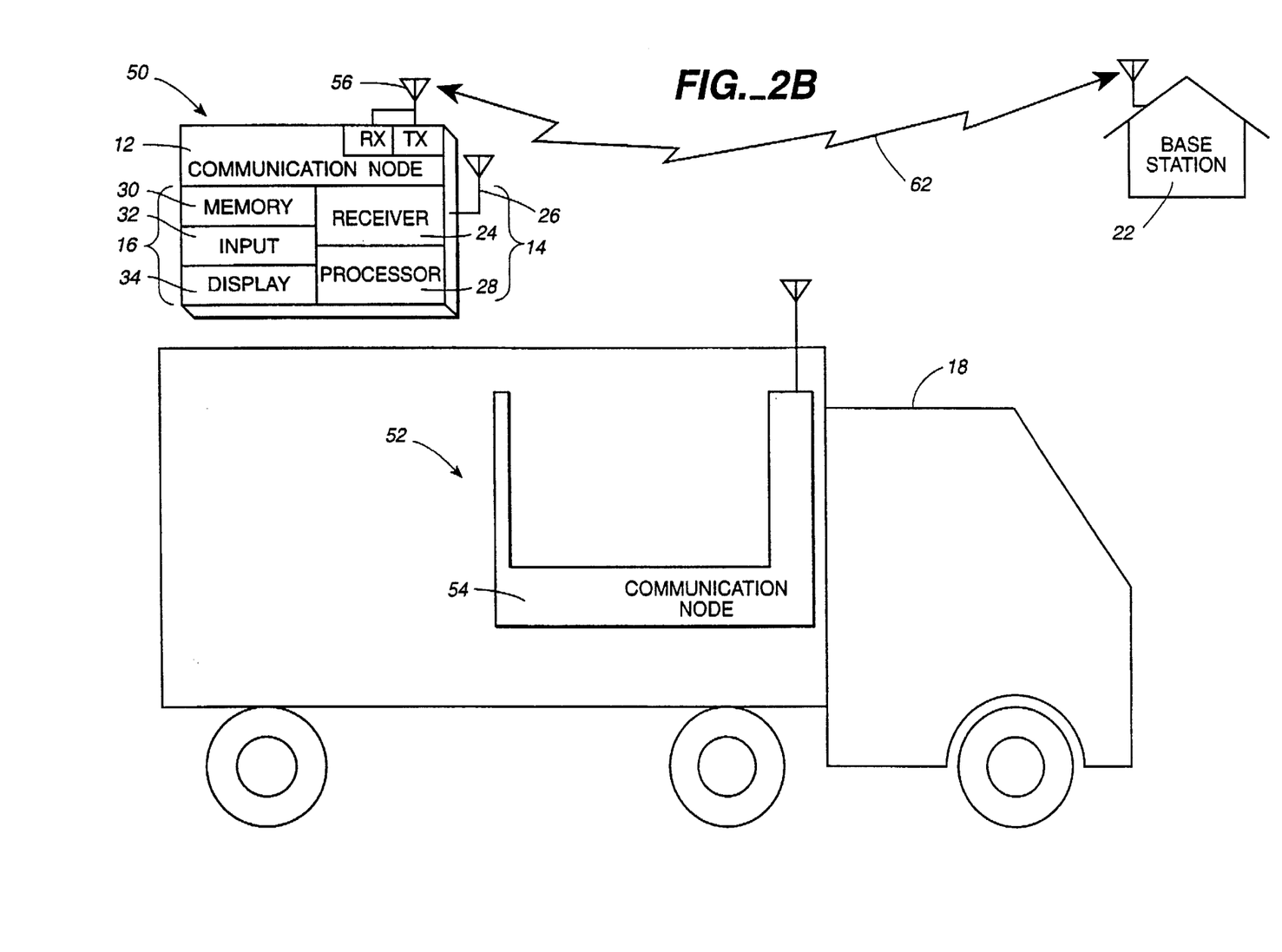
FIG. 2B is a schematic diagram of the integrated geographic information and automatic vehicle location system of FIG. 2A wherein the portable data terminal is communicatively linked directly to a base station in accordance with the present invention.

With reference next to FIG. 2B, a schematic diagram of another embodiment of the present invention is shown in which portable data terminal 50 communicates directly with base station 22. As shown in FIG. 2B, when portable data terminal 50 is removed from docking station 52 communication node 12 establishes a communication link 62 between portable data terminal 50 and base station 22. By communicatively linking portable data terminal 50 directly with base station 22 the present embodiment eliminates the need for an additional communication node at docking station 52. As described in conjunction with previous embodiments, communication link 62 is established using, for example, a Metricomm Wide Area Network (WAN) link, a standard cellular telephone connection, a trunked radio system, a Cellular Digital Packet Data (CDPD) protocol, a Subscription Mobile Radio (SMR) system, or an rf communication link and the like.

In the present embodiment, when portable data terminal 50 is removed from docking station 52, antenna 56 facilitates transmission and reception of information signals. In this embodiment, when portable data terminal 50 is placed into docking station 52, antenna 58 facilitates transmission and reception of information signals. That is, antenna 56 folds up or is otherwise disabled when portable data terminal 50 is placed into docking station 52, thereby insuring that only one antenna is used to receive information signals at any given time.

Figure 2C:
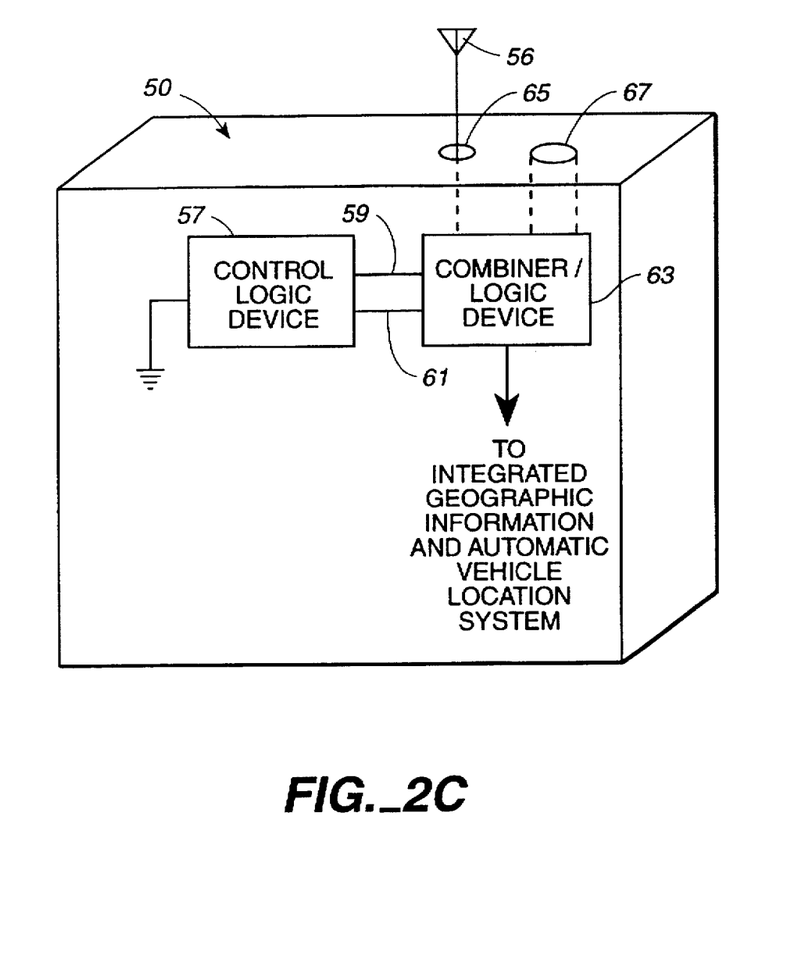
FIG. 2C is a schematic diagram of an antenna multiplexing system in accordance with the present invention.

With reference next to FIG. 2C, a schematic diagram of an antenna multiplexing system of one embodiment of the present invention is shown. In the present embodiment, portable data terminal 50 includes control logic device 57 which provides power D.C. power line 59 or 61 to combiner/logic device 63. Combiner/logic device 63 is coupled to both local antenna LNA (low noise amplifier) input port 65, and remote antenna LNA input port 67. In the present embodiment, combiner/logic device 63 is a 3 dB passive hybrid microwave combiner with an integral DC supply to each input port 65 and 67, respectively.

Control logic device 57 senses connections and adjusts the supply of D.C. power accordingly. Specifically, control logic device 63 senses the current draw from local antenna LNA input port 65 and/or from remote antenna LNA input port 67. When remote antenna LNA input port is drawing current, the local antenna is turned off or de-activated. Thus, whenever portable data terminal 50 is removed from docking station 52 of FIG. 2B, and a remote antenna is inserted into remote antenna LNA input port 67, local antenna 56 is de-activated. Although such an antenna configuration is used in the present embodiment, the present invention is also well suited to the use of other types of antenna configurations.

The present invention is also well suited to having a remotely disposed antenna plugged into remote antenna LNA input port 67. For example, the present invention is well suited to having a connecting cable, extending from a hard hat embedded antenna, plugged into remote antenna LNA input port 67. Likewise, the present invention is also well suited to having a connecting cable extending from a hand-held antenna plugged into remote antenna LNA input port 67. Thus, the present invention allows distantly located antennae to be coupled thereto.

Figure 2D:
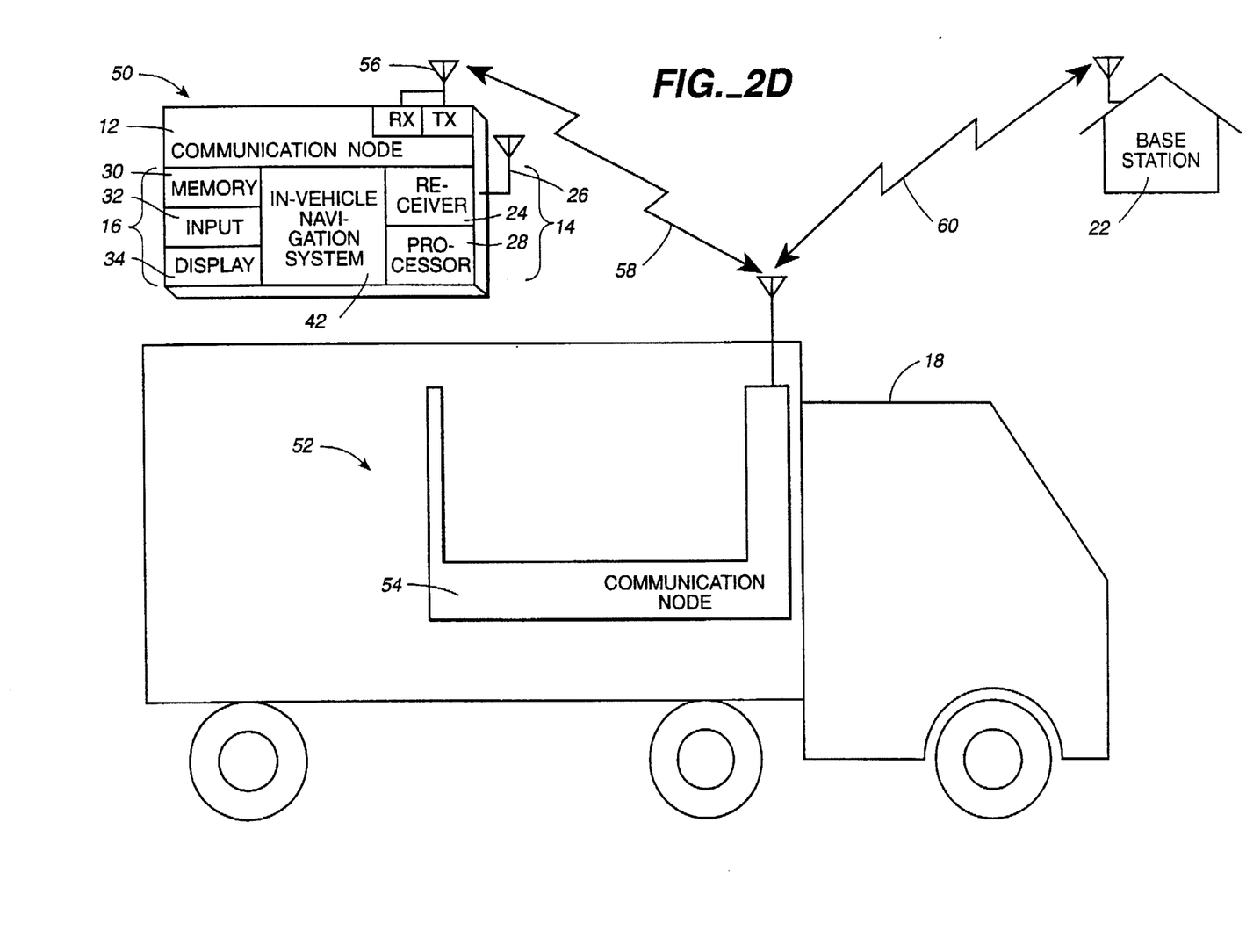
FIG. 2D is a schematic diagram of the integrated geographic information and automatic vehicle location system of FIG. 2A including an in-vehicle navigation system in accordance with the present invention.

With reference next to FIG. 2D, a schematic diagram of another embodiment of the present invention in which the integrated geographic information and automatic vehicle location system includes an in-vehicle navigation system 42 is shown. In-vehicle navigation system typically includes a data base located at a base station for storing navigational information. As shown in FIG. 2D, in-vehicle navigation system 42 is coupled to communication node 12. Therefore, in the present embodiment, navigational information can be transmitted to portable data terminal 50 when desired, even if portable data terminal is not located within vehicle 18. In the present embodiment, the navigational information is displayed on the display unit located on portable data terminal 50. Thus, a user of the present invention can access navigational information and have the information visually displayed. Likewise, the input of portable data terminal 50 is also used to input various in-vehicle navigation-related information. Such information includes, for example, a request for the base station to transmit navigation information on a desired area. As a result, new navigational information is accessible to a user of the present system without requiring the user to return to the base station. Hence, the present invention provides another degree of functionality and marketability.

Figure 3A:
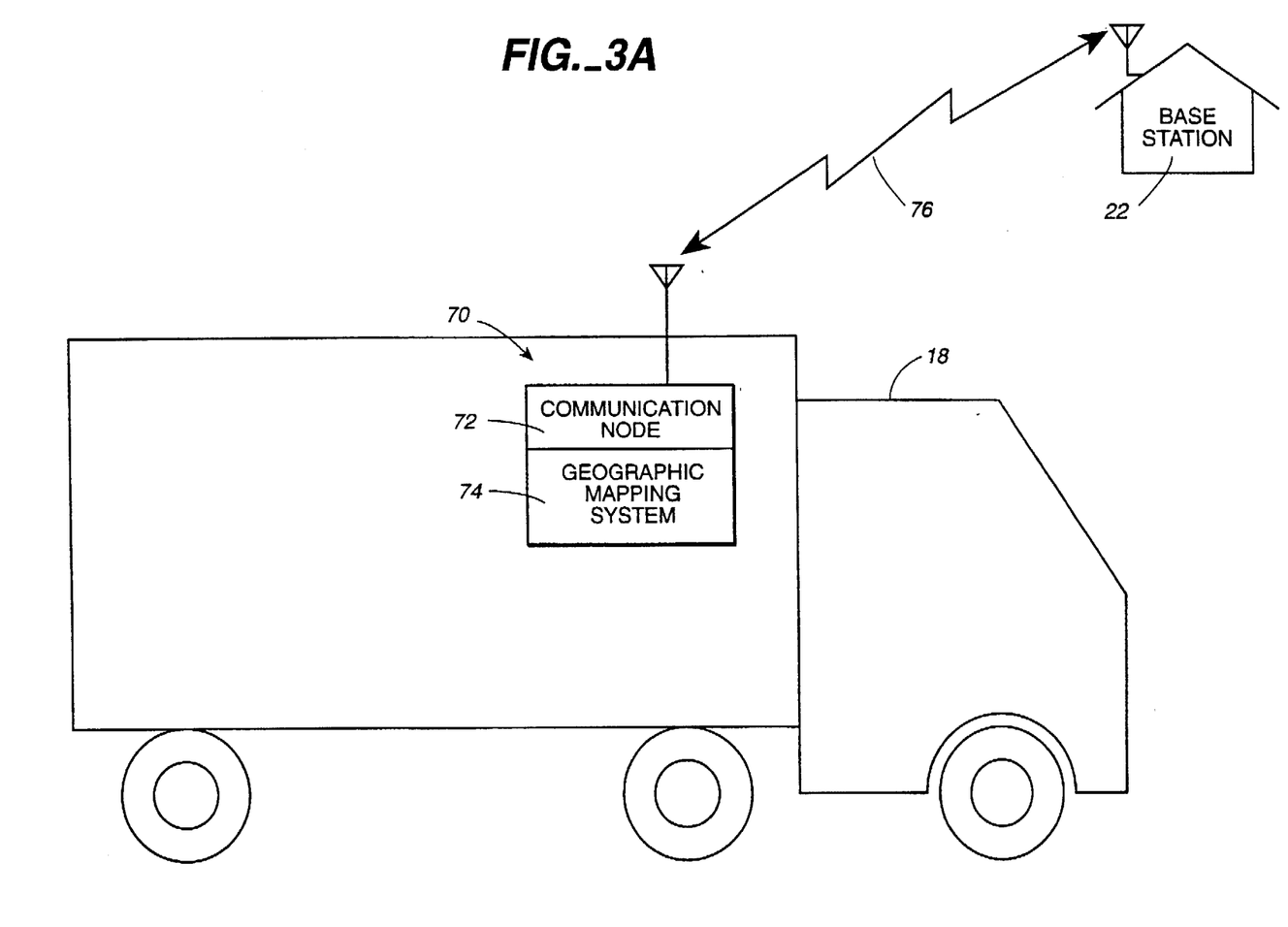
FIG. 3A is a schematic diagram of a real-time geographic mapping system disposed within a vehicle wherein the system communicates in real-time with a base station in accordance with the present invention.

With reference next to FIG. 3A, a schematic block diagram of another embodiment of the present invention is shown in which a geographic mapping system disposed within a vehicle communicates in real-time with a base station. As shown in FIG. 3A, the present real-time geographic information system 70 includes a communication node 72, and a geographic mapping system 74 disposed within a vehicle 18. Communication occurs in real-time over link 76 between real-time geographic information system 70 and base station 22.

As described in conjunction with previous embodiments, communication link 76 is established using, for example, a Metricomm Wide Area Network (WAN) link, a standard cellular telephone connection, a trunked radio system, a Cellular Digital Packet Data (CDPD) protocol, a Subscription Mobile Radio (SMR) system, or an rf communication link and the like.

Figure 3B:
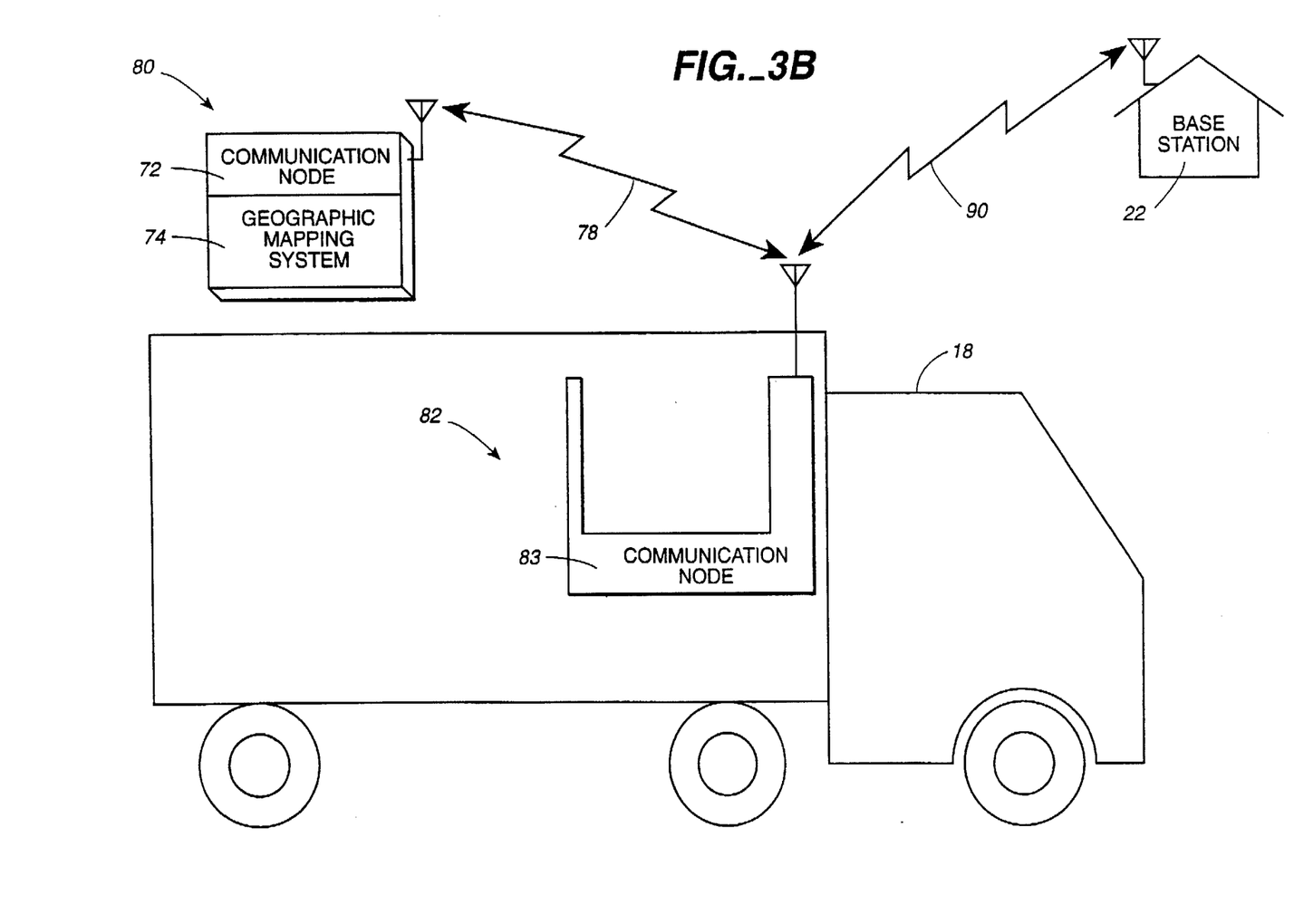
FIG. 3B is a schematic diagram of the real-time geographic mapping system of FIG. 3A wherein the system includes a portable data terminal in accordance with the present invention.

With reference next to FIG. 3B, a schematic diagram of another embodiment of the present invention is shown wherein real-time geographic information system 70 includes a portable data terminal 80. In the present embodiment, communication node 72 and geographic mapping system 74 are disposed within a portable data terminal 80. A docking station 82 is disposed within vehicle 18. As shown in FIG. 3B, portable data terminal 80 is removably attachable to docking station 82. That is, portable data terminal 80 can perform GIS functions when disposed within docking station 82 and when removed from docking station 82.

With reference still to FIG. 3B, in the present embodiment, when portable data terminal 80 is removed from docking station 82 portable data terminal 80 communicates with docking station 82. More specifically, communication node 72 of portable data terminal 80 transfers information over link 88 to communication node 83 of docking station 82. Docking station 82 then transfers information to and from base station 22 over link 90. In so doing, portable data terminal 80 is able to transmit using low power and still communicate, through docking station 82, with base station 22. Thus, portable data terminal 80 is able to operate using low power sources such as batteries. As with communication link 20 of FIGS. 1A–1C, and 1E, communication links 88 and 90 can be established using, for example, any combination of Metricomm Wide Area Network (WAN) links, a standard cellular telephone connections, a trunked radio system, a Cellular Digital Packet Data (CDPD) protocol, a Subscription Mobile Radio (SMR) system, or rf communication links and the like. Although communication node 83 of docking station 82 acts as a relay station for information transmitted to portable data terminal 80 from base station 22, the present invention is also well suited to having base station 22 transmit information directly to communication node 72 of portable data terminal 80.

The foregoing descriptions of specific embodiments of the present invention have been presented for the purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. An integrated geographic information, automatic position locating, navigation, and communication system, comprising:

a docking station located within a vehicle to be monitored;

a portable, dockable data terminal removably disposed within said docking station, said portable data terminal including a first communication node, said portable data terminal including an input for a user entering information and said portable data terminal including a display unit;

said first communication node providing a real-time communication connection between said portable, dockable data terminal of said integrated geographic information, automatic position locating, navigation, and communication system and at least one desired location, said first communication node including a transmitter for sending information from said portable dockable data terminal of said integrated geographic information, automatic position locating, navigation, and communication system to said at least one desired location, said first communication node also including a receiver for receiving information from said at least one desired location at said portable, dockable data terminal of said integrated geographic information, automatic position locating, navigation, and communication system;

wherein said docking station of said integrated geographic information, automatic position locating, navigation, and communication system includes a second separate communication node for two-way, real-time communicatively coupling said portable data terminal to said second communication node when said portable data terminal is removed from said docking station; and wherein said portable data terminal is coupled to said desired location via said second node at said docking station;

a position tracking system contained within said portable, dockable data terminal and coupled to said vehicle to be monitored, said position tracking system coupled to said first communication node, wherein said input of said portable data terminal is further adapted for use with said position tracking system, and wherein said display unit of said portable data terminal is further adapted for displaying visual representations related to said position tracking system;

a navigation system contained within said portable, dockable data terminal and coupled to said first communication node, wherein said input for entering information on said portable, dockable data terminal is further adapted for use with an in-vehicle navigation system disposed within said vehicle to be monitored, and wherein said display unit of said portable, dockable data terminal is further adapted for displaying visual representations related to said in-vehicle navigation system; and a geographic mapping system contained within said portable, dockable data terminal and adapted to be disposed within said vehicle to be monitored, said geographic mapping system coupled to said first communication node wherein said geographic mapping system further includes: memory for storing previously recorded first geographic information, wherein said input of said portable data terminal is further adapted for use with said geographic mapping system to enable a user to enter new geographic information, and wherein said display unit of said portable data terminal is further adapted for displaying visual representations related to said geographic mapping system providing for displaying visual representations of said previously recorded first geographic information and said new geographic information.

2. The integrated geographic information, automatic position locating, navigation, and communication system of claim 1 wherein said vehicle position tracking system further includes a GPS signal receiver and a signal processor coupled to said signal receiver for generating position information from signals received by said signal receiver.

3. The integrated geographic information, automatic position locating, navigation, and communication system of claim 1 wherein said geographic mapping system is adapted to having said previously recorded first geographic information updated.

4. The integrated geographic information, automatic position locating, navigation, and communication system of claim 2 wherein said previously recorded first geographic information is adapted to being updated using position information generated by said GPS receiver of said vehicle position tracking system.

5. The integrated geographic information, automatic position locating, navigation, and communication system of claim 1 wherein said first communication node further includes a communication equipment selected from the group consisting of a Metricomm Wide Area Network equipment, a subscription mobile radio communication equipment, a cellular telephone communication equipment, a cellular digital packet data communication equipment, a trunked radio system communication equipment, and an rf communication equipment.

6. The integrated geographic information, automatic position locating, navigation, and communication system of claim 1 wherein said second communication node further includes a communication equipment selected from the group consisting of a Metricomm Wide Area Network equipment, a subscription mobile radio communication equipment, a cellular telephone communication equipment, a cellular digital packet data communication equipment, a trunked radio system communication equipment, and an rf communication equipment.

7. The integrated integrated geographic information, automatic position locating, navigation, and communication system of claim 1 wherein said docking station further includes an antenna and wherein said portable data terminal further includes an antenna which is operable when said portable data terminal is removed from said docking station.

8. The integrated geographic information, automatic position locating, navigation, and communication system of claim 1 further including a panic button for alerting at least one desired party via a communication equipment that a user of said portable, dockable integrated geographic information, automatic position locating, navigation, and communication system is in distress.

* * * * *